US005162616A

United States Patent [19]

[11] Patent Number: 5,162,616

Swaffield et al.

[45] Date of Patent: Nov. 10, 1992

[54] BUS BAR ASSEMBLY

[75] Inventors: John D. Swaffield, Danvers, Mass.; Kurt C. Hetzel, Phoenix, Ariz.

[73] Assignee: Precision Connector Designs, Inc., Peabody, Mass.

[21] Appl. No.: 657,449

[22] Filed: Feb. 15, 1991

[51] Int. Cl.⁵ .............................................. H02G 5/06

[52] U.S. Cl. ................................ 174/99 B; 174/70 B; 228/110; 228/179; 439/119; 439/213

[58] Field of Search .................. 174/99 B, 70 B, 68.2, 174/129 B; 439/110, 119, 212, 213, 214; 228/110, 179

[56] References Cited

U.S. PATENT DOCUMENTS

| | | | |
|---|---|---|---|
| 2,666,907 | 1/1954 | Hensley, Jr. | 439/119 |
| 2,720,632 | 10/1955 | Stieglitz | 439/114 |
| 2,924,804 | 2/1960 | Frank et al. | 439/119 |
| 3,089,042 | 5/1963 | Hickey et al. | 439/110 X |
| 4,079,439 | 3/1978 | Coles et al. | 174/70 B X |
| 4,082,393 | 4/1978 | Gamble | 439/110 X |
| 4,112,249 | 9/1978 | Carlson | 174/68.2 |
| 4,494,808 | 1/1985 | Widell et al. | 439/119 |
| 4,897,048 | 1/1990 | Liebon et al. | 439/212 X |

*Primary Examiner*—Morris H. Nimmo
*Attorney, Agent, or Firm*—Edwin H. Paul; Jerry Cohen

[57] ABSTRACT

A bus bar assembly including an elongated insulative base member and a plurality of modular insulative unit pieces attached to the base member and having contact receiving openings, conductive bus bars in an enclosed region defined by the base member and unit pieces, contact pins of the bus bar extending upward into insulative tubular members extending downward from and centered within the openings, insulative fins supporting the bus bars above a bottom wall of the base member, an insulative divider wall between adjacent bus bars extending upward from the bottom wall, mounting holes in the upper and lower walls, and an insulative shield between the region between mounting holes and the bus bars.

23 Claims, 3 Drawing Sheets

BUS BAR ASSEMBLY

FIELD OF THE INVENTION

The invention relates to bus bar assemblies.

BACKGROUND OF THE INVENTION

Bus bars are used to distribute ground and voltage. Some bus bar assemblies, e.g., a type used in aircraft, employ copper bars that have contact pins extending from it for mating with tubular contacts of connectors to external circuits. The bus bar is contained in a solid plastic housing having holes for the contact pins.

SUMMARY OF THE INVENTION

In one aspect, the invention features, in general, a bus bar assembly employing an elongated base member made of a single piece of insulative material and a plurality of unit pieces that are attached to the base member and have contact receiving structures. The base member and the unit pieces together define an enclosed bus bar receiving region that receives an elongated bus bar having contact portions aligned with the contact receiving structures. Bus bar assemblies of any desired length and number of contact portions can be easily made by simply making the base member and bus bar of the desired length and using the needed number of unit pieces. The arrangement provides the flexibility of modular design and the structural rigidity provided by the single-piece base member.

In preferred embodiments, the base member is made of an extrusion that has been cut to the desired length, and base end pieces are attached to the ends of the base member. The base member has a bottom wall and two side walls, and the unit pieces span the distance between the tops of the two side walls. The unit pieces have overlapping portions and tubular members that fit over the contact pins of the bus bar and guarantee proper alignment of the unit pieces with the contact pins. The unit pieces are ultrasonically welded to each other and to the base member.

In another aspect, the invention features, in general, a bus bar assembly employing a bus bar having contact pins extending upward from it and tubular members of insulative material extending downward from openings in a housing wall and surrounding respective contact pins. Each tubular member has an upper portion with an interior dimension large enough to receive a tubular contact that mates with a contact pin of the bus bar and a lower portion that fits tightly around the contact pin of the bus bar, causing the contact pin to be centered in the tubular member to facilitate mating with a tubular contact of a connector inserted into the opening in the top wall of the housing.

In another aspect, the invention features, in general, a bus bar assembly in which a bus bar is supported above a lower wall of a housing by insulative portions that only contact a portion of the bus bar, permitting the nonsupporting portion of the bus bar to contact air within the housing. By spacing the bus bar above the bottom wall, there is less chance of inducing current in any conductors on a surface on which the bus bar assembly is mounted. By having air around the bus bar, air circulation is promoted, avoiding overheating.

In another aspect, the invention features, in general, a bus bar assembly including a housing having outer walls and an inner divider wall that is between two bus bars and extends upward from a bottom wall. The divider wall is joined to the bottom wall so as to prevent arcing between the bus bars under the divider wall. The divider wall also extends above the bus bars to prevent arcing between bus bars over the top of the wall.

In another aspect, the invention features, in general, a bus bar assembly including an insulative housing having outer walls defining an enclosed region therein in which a conductive bus bar is located. Lower and upper housing walls have aligned mounting holes, and an insulative shield is placed between the region between the mounting holes and the bus bar, preventing arcing between the bus bar and a mounting fastener (e.g., a screw or a bolt) passing through the mounting holes.

Other advantages and features of the invention will be apparent from the following description of the preferred embodiment and from the claims.

DESCRIPTION OF THE PREFERRED EMBODIMENT

The preferred embodiment will now be described.

DRAWINGS

STRUCTURE

Figure 1:
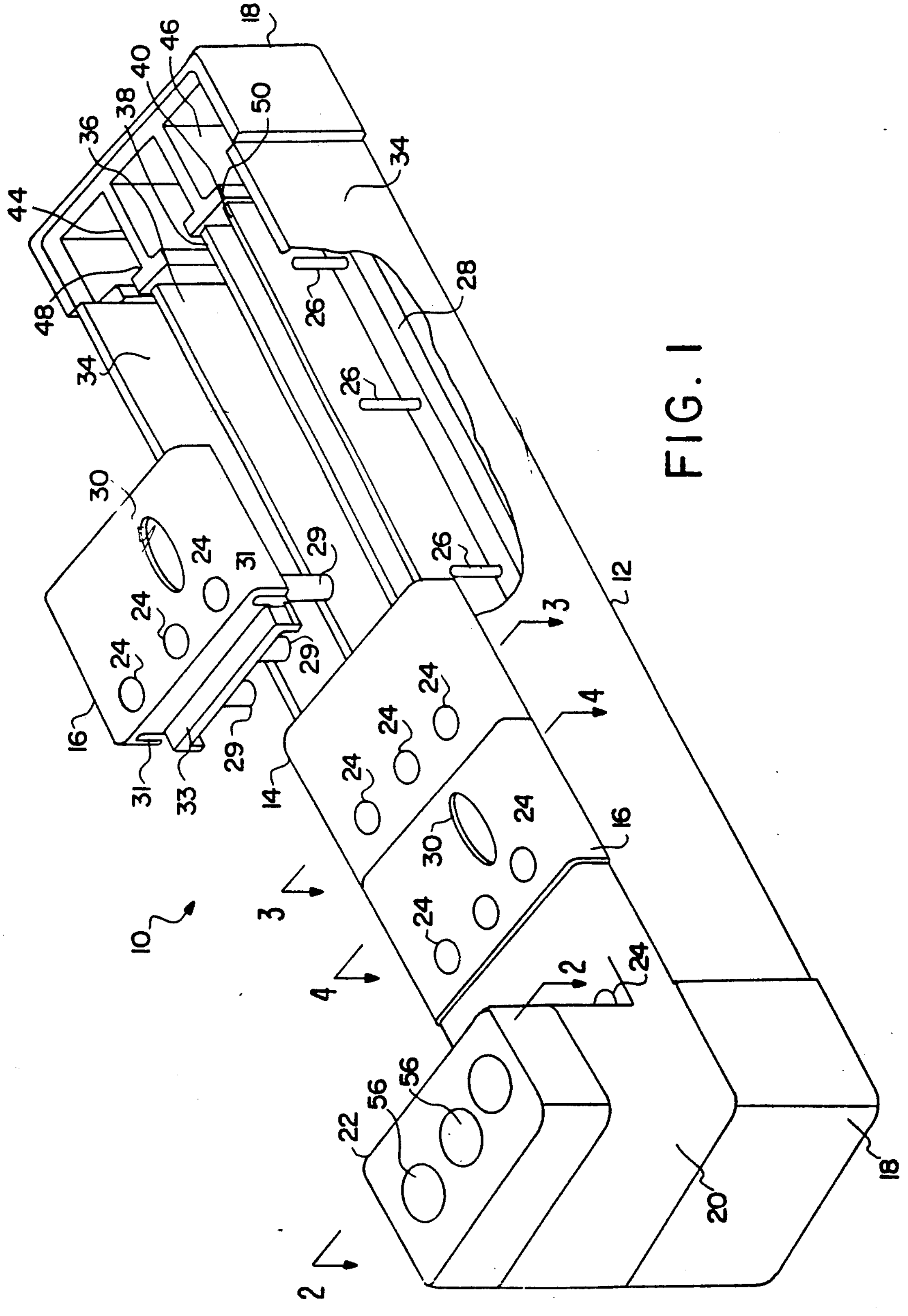
FIG. 1 is a perspective view, partially exploded and broken away, of a bus bar assembly according to the invention.

Referring to the drawings, bus bar assembly 10 includes elongated base member 12, regular unit pieces 14 and through-hole unit pieces 16 along the top of base member 12, base end pieces 18 at the ends of base member 12, and an end unit piece 20 and cap 22 thereto on top of a base end piece 18. In FIG. 1, assembly 10 is shown only partially assembled. In final assembly it would have two more unit pieces 14 or 16, and either another end unit piece 20 and cap 22 (if desired to connect to another bus bar assembly), or a simple unit piece that covers end unit piece 18.

Figure 3:
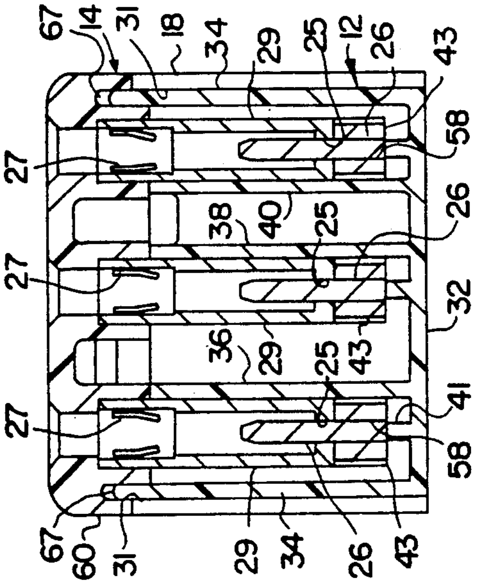
FIG. 3 is a vertical sectional view, taken at 3—3 of FIG. 1, of the FIG. 1 bus bar assembly.

Each unit piece 14 or 16 has three contact receiving openings 24 aligned with contact pins 26 of three bus bars 28. Underneath each opening 24 is a tubular member 29, which fits over a respective contact pin 26. Located in the upper portion of each tubular member 29 is a retention clip 27 (FIG. 3), used to retain tubular contacts inserted into openings 24. At the bottom of each tubular member 29 is a small hole 25 that centers contact pin 26 in the larger . interior diameter space of tubular member 29. Each unit piece 16 also has a mounting hole 30 for receiving a fastener (e.g., a screw or a bolt) that passes through assembly 10 and secures it to a support below, e.g., an aircraft bulkhead. All unit pieces 14, 16 have the same width dimension along the longitudinal axis of base member 12. Each unit piece 14, 16 has slots 31, for receiving the tops of walls 34, and a tongue 33 that is received under and overlaps an adjacent unit piece 14, 16.

Figure 4:
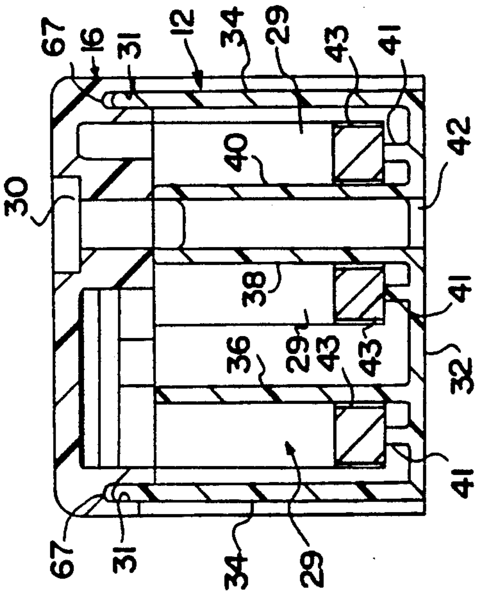
FIG. 4 is a vertical sectional view, taken at 4—4 of FIG. 1, of the FIG. 1 bus bar assembly.

Base member 12 has bottom wall 32 (FIGS. 3, 4), side walls 34, three vertical walls 36, 38, 40 and fins 41, which support current distributing bar 43 of bus bar 28. Base member 12 is formed as an extrusion and thus has a uniform cross-section along its length except where mounting holes 42 (FIG. 4) have been drilled through bottom wall 32.

Figure 2:
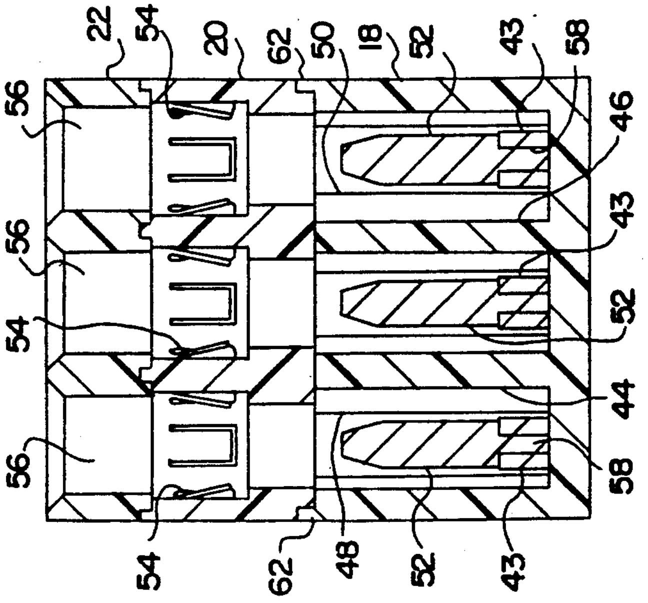
FIG. 2 is a vertical sectional view, taken at 2—2 of FIG. 1, of the FIG. 1 bus bar assembly.
Figure 6:
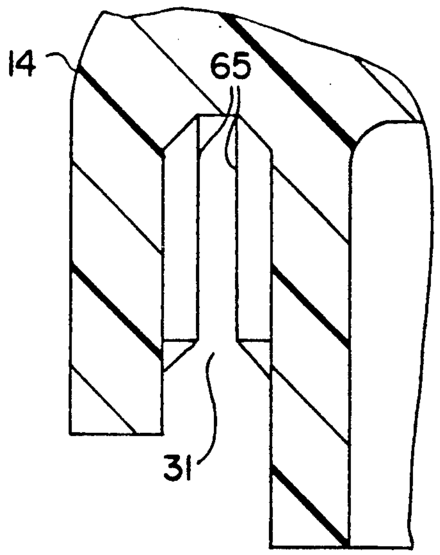
FIG. 6 is a partial sectional view, taken at 6—6 of FIG. 5, of the FIG. 5 unit piece.

Referring to FIGS. 1 and 2, each base end piece 18 has two walls 44, 46 parallel to the longitudinal axis of base member 12 and transverse portions 48, 50, which abut the ends of wall 36 and walls 38, 40, respectively. The portion of bus bar 28 in the base end piece 18 under end unit piece 20 has enlarged contact pins 52, which are used to mate with power contacts. End unit piece 20 has retention clips 54 in holes through it to retain tubular contacts inserted in contact openings 56 in cap 22.

Base member 12, unit pieces 14, 16 (including tubular members 29), base end piece 18, end unit piece 20, and cap 22 are all made of polyetherimide (available from General Electric under the ULTEM trade designation).

MANUFACTURE

In manufacture, an extrusion having the section of base member 12 is cut to the desired length corresponding to the number of unit pieces 14, 16 to be employed. The number and location of unit pieces 16 is selected to provide the desired mounting holes in the desired locations, which can be selected to provide a unique pattern to insure installation of the proper bus bar assembly 10. Mounting holes 42 are drilled at the appropriate locations, and base ends 18 are secured to base member 12 using a two-part epoxy continuously along the ends of walls 32, 34, 36, 38 and 40 in order to provide a water-tight seal at the junction.

Bus bar 28 is made by cutting current distributing bar 43 ($\frac{1}{8}$" square section copper bar) to the desired length and drilling holes 58 through it at positions corresponding to contact openings 24, 56. The knurled bottom ends of contact pins 26 and 52 are then pressed into holes 58; ring-shaped solder preforms are placed around the bottoms of contact pins 26, 52, and bus bar 28 is placed in an oven to melt the solder, which runs down into the spaces between the knurled ends and holes in bar 43. The bus bar is then plated with nickel 50 microinches thick.

Unit pieces 14, 16 are preassembled by inserting retention clips 27 into the tips of tubular members 29, and inserting tubular members 29 into holes in plate 60 of unit pieces 14, 16. Clips 27 and tubular members 29 are similarly inserted in end unit piece 20. Clips 54 are inserted in holes in end unit piece 20, and cap 22 is fitted on top of end unit piece 20. Clips 27 and 54 are held in place by the smaller diameter of the pieces above them.

In putting together assembly 10, bus bars 28 are placed into base member 12 and attached end pieces 18 over respective fins 41. End unit piece 20 and cap 22 are then fitted onto the end of member 12 and piece 18; unit piece 20 is properly positioned with respect to end piece 18 by fitting within a ledge 62 (FIG. 2) which extends around piece 18. Bus bars 28 are properly positioned with respect to piece 20 (and thus piece 18 and attached base member 12) by insertion of contact pin 26 in holes 25 of tubular members 29.

Figure 5:
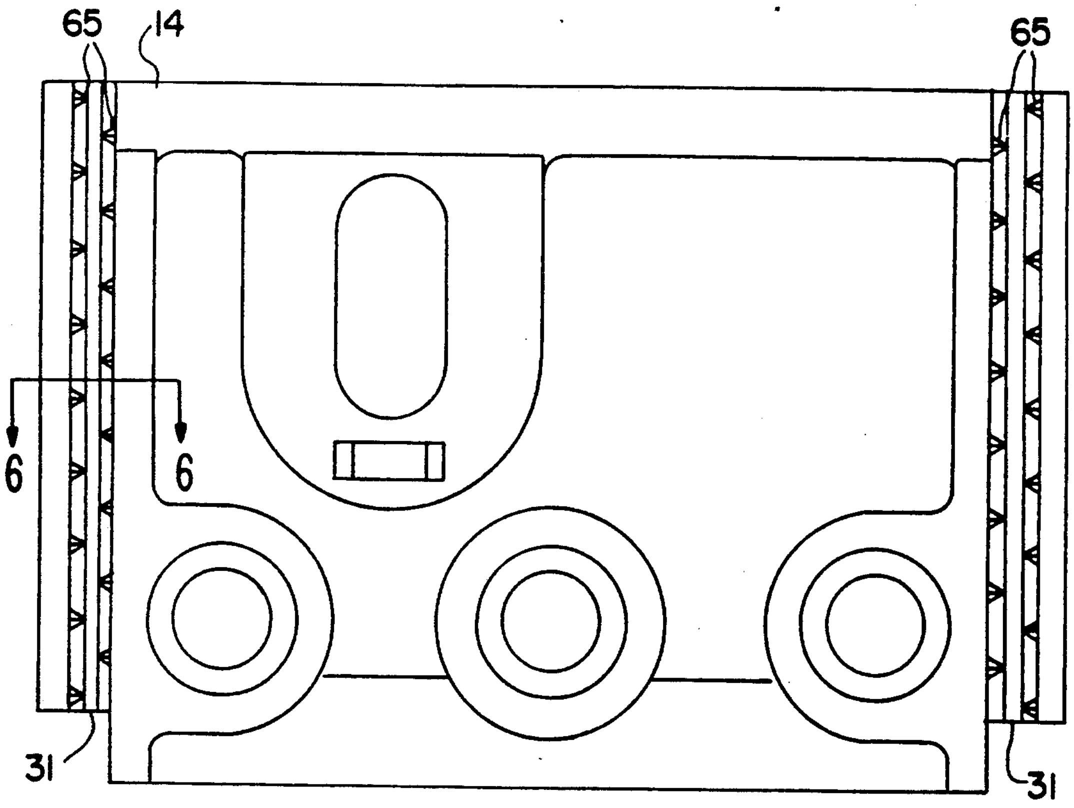
FIG. 5 is a bottom view of a unit piece of the FIG. 1 bus bar assembly prior to ultrasonic welding to other parts.

Piece 20 is then ultrasonically welded to cap 22, end piece 18 and base member 12. The adjacent unit piece 14 or 16 is then fitted on base member 12, pin 26 being centered in holes 25. The distance between unit piece 14 or 16 and piece 20 may vary slightly (owing to tolerances and depending on the actual spacing of holes 58 in current distributing bar 43), and any such variation is accommodated by the ability of tongue 33 to underlie piece 20 by a variable amount. The unit piece 14 or 16 is then ultrasonically welded to base member 12 and the adjacent unit piece 20. Slot 31 has small vertical energy directing ridges 65 (FIG. 5) that extend part way in from the edges and are melted during ultrasonic welding and form a fused joint with the extrusion. The welding procedure involves downward pressure on the unit piece, which stops downward travel when the bottoms of tubular members 29 hit current distributing bar 43. The tops of side walls 34 do not necessarily bottom out, and the space 67 between the tops of side walls 34 and the tops of slots 31 may vary, owing to tolerances in the extrusion process. Energy directing ridges 65 provide a sliding joint during the welding, and the fusion of the ridges along whatever length is necessary provides a strong bond without the need for bottoming out. The next unit piece 14, 16 is then fitted and ultrasonically welded, and so on until the end is reached, and an end unit piece is fitted and welded. The ultrasonic welding provides structural and sealable connections between adjacent unit pieces and base member 12.

OPERATION

In operation, ground and/or voltage sources are connected to bus bars 28 by insertion of connectors with tubular contacts into openings 56 and connection to contact pins 52. Smaller tubular connectors are inserted into openings 24 and connected to contact pins 26, to connect voltage or ground to the desired component or circuit node. The mounting of bus bar 28 on fin 41 acts to space bus bar 28 above the surface on which the assembly is mounted, tending to avoid dielectric breakdown through the bottom wall, avoid induction of current in the metal mounting surface (which would be at ground potential) and to minimize impedance. Fin 41 also leaves a substantial portion of the bottom surface of bus bar 28 exposed to air, facilitating air circulation and avoiding overheating. With the exception of surfaces blocked by tubular members 29 and fins 41, all surfaces of bus bar 28 are exposed to a volume of air. Walls 36, 38 and 40 are between adjacent bus bars and are sealed to bottom wall 32 and extend quite a bit above exposed current distributing bars 43 of bus bars 28, avoiding arcing between adjacent bus bars by the long travel path between them. When assembly 10 is used in a humid environment, and condensation forms on the surfaces inside assembly 10, the distance between bus bars caused by having to go around walls 36, 38 and 40 prevents arc tracking along moist surfaces between bus bars. Because walls 36, 38 and 40 are integrally formed with bottom wall 32, it is guaranteed that there are no voids that might otherwise fill with water. Walls 38 and 40 provide an insulative shield between the region between mounting holes 30, 42 (which is occupied by a bolt) and adjacent bus bar 28. A further advantage of assembly 10 is its light weight which results from providing walls and supporting structure for the conductive components only where they are needed, instead of using solid plastic for the housing.

Other embodiments of the invention are within the scope of the following claims.

What is claimed is:

1. A bus bar assembly for distributing current comprising:

an elongated base member made of a single piece of insulating material and extending along a longitudinal base axis, a plurality of unit pieces made of insulating material and attached to said base member at different locations along said base axis, each said unit piece defining a contact receiving structure, said unit pieces defining with said base member an enclosed bus bar region extending parallel to said axis, and an elongated, conductive bus bar mounted in said region and having fixed, discrete contact portions, wherein said contact receiving structures are positioned to be aligned with respective said discrete, fixed contact portions.

2. The assembly of claim 1 wherein said base member has portions with the same cross-section along its length.

3. The assembly of claim 2 wherein said base member is made of an extrusion and further comprising end pieces at the two ends of said base member.

4. The assembly of claim 3 wherein a said unit piece at an end mates with the said end piece underneath it.

5. The assembly of claim 4 wherein said unit piece at an end extends higher above said base member than other said unit pieces and is adapted to receive power supply connectors.

6. The assembly of claim 1 wherein said base member has a bottom wall and two side walls, and said unit pieces span from the top of one side wall to the other and abut adjacent unit pieces along said axis.

7. The assembly of claim 6 wherein said unit pieces have portions overlapping adjacent unit pieces.

8. The assembly of claim 7 wherein said unit pieces have downward directed slots receiving the tops of said two side walls, and wherein said unit pieces are ultrasonically welded to adjacent unit pieces and to said side walls.

9. The assembly of claim 8 wherein said slots have vertical energy directing ridges that form fused joints with the tops of said side walls, at least some of said unit pieces having spaces between the tops of said side walls and the tops of said slots.

10. The assembly of claim 1 further comprising at least one more additional bus bar parallel to said axis.

11. The assembly of claim 10 wherein said base member has a bottom wall and a divider wall parallel to said axis between said bus bars, said divider wall being joined to said bottom wall so as to prevent arcing between said bus bars underneath said divider wall and extending above said bus bars so as to prevent arcing between said bars over the top of said wall divider.

12. The assembly of claim 1 wherein said contact receiving structures define tubular members that receive said contact portions therein.

13. The assembly of claim 12 wherein said contact portions are contact pins extending upward into said tubular members, each said tubular member having a first interior dimension along an upper portion thereof for receiving a tubular contact and a second interior dimension at a lower portion that is large enough to receive said contact pin but smaller than said first dimension to center said contact pin within said tubular member.

14. The assembly of claim 13 wherein said base member has a bottom wall and two side walls, and said unit pieces span from the top of one side wall to the other and abut adjacent unit pieces along said axis, and said unit pieces have portions overlapping adjacent unit pieces.

15. The assembly of claim 1 wherein said base member provides a lower wall, and said unit pieces define an upper wall, and wherein the lower wall and upper walls of some of said unit pieces have aligned mounting holes through them that are located along mounting axes that are perpendicular to said base axis and are adapted to receive elongated mounting fasteners passing through said base member and unit piece in the regions between said holes, said regions not passing through said bus bar, and further comprising an insulative shield member between said regions and said bar to prevent arcing between said bar and said mounting fasteners.

16. The assembly of claim 1 wherein said base member includes a bottom wall and a mounting structure made of insulative material extending upward from said bottom wall, said mounting structure having bus bar supporting portions along a bus bar mounting axis that is parallel to said base axis and wherein said bus bar has supported bus bar portions of a lower surface supported by said bus bar supporting portions above said bottom wall, said lower surface also having nonsupported bus bar portions exposed to air between the lower surface of said bus bar, and said bottom wall.

17. A bus bar assembly for distributing current comprising a housing made of insulative material and having walls defining an enclosed bus bar region, a conductive bus bar that is located in said region and has a current distributing portion and a plurality of elongated contact pins extending upward from said current distributing portion, said walls including an upper wall having openings aligned with said contact pins, and tubular members of insulative material extend downward from said openings toward said bus bar, each said tubular member receiving a said contact pin and having a first interior dimension along an upper portion thereof for receiving a tubular contact and a second interior dimension at a lower portion that is large enough to receive said contact pin but smaller than said first dimension to center said contact pin within said tubular member.

18. The assembly of claim 17 further comprising a retaining clip supported in said upper portion to retain a said tubular contact therein.

19. The assembly of claim 18 wherein said tubular member is made of a separate piece of material than said upper wall, and wherein said opening through said upper wall has a dimension that is smaller than said first dimension to retain said clip therein.

20. The assembly of claim 19 wherein said tubular member is ultrasonically welded to said upper wall.

21. A bus bar assembly for distributing current comprising:

an elongated base member made of insulating material and including a bottom wall extending along a longitudinal base axis, a divider wall made of insulating material and extending parallel to said base axis and upward from said bottom wall so as to partially define two bus bar regions on opposite sides of said divider wall, and two elongated conductive bus bars mounted in respective said bus bar regions, said divider wall being integral to said base member so as to prevent arcing between said bars underneath said divider wall, said divider wall extending above said bus bars so as to prevent arcing between said bars over the top of said wall, said base member made of an extrusion with the same cross section along its length, end pieces at the two ends of said base member, and a mounting structure made of insulating material extending upward from said bottom wall, said mounting structure having bus bar supporting portions along a bus bar mounting axis that is parallel to said base axis, and wherein said bus bar has supported bus bar portions of a lower surface, supported by said bus bar supporting portions above said bottom wall, said lower surface also having nonsupported bus bar portions exposed to air between the lower surface of said bus bar and said bottom wall.

22. A bus bar assembly for distributing current comprising:

an elongated hosing extending along a longitudinal housing axis and made of insulative material and having a lower wall, and upper wall, and two side walls defining an enclosed bus bar region therein, an elongated, conductive bus bar mounted in said region, said lower wall and upper wall having elongated mounting holes through said walls, said mounting holes' axes being perpendicular to said housing axis, wherein said mounting holes are adapted to receive elongated mounting fasteners passing through said upper mounting holes to said lower mounting holes, and an insulative shield member disposed along said housing axis between said upper and lower walls, said shield separating said fasteners and said bus bar thereby preventing arcing between the bus bar and the fastener.

23. A method of making a bus bar assembly comprising ultrasonically welding the tops of two side walls of an extruded plastic, elongated base member in downward directed slots in a plurality of plastic unit pieces having vertical fins extending in from the sides of the slots so that a fused joint results between the fins and the tops of the side walls.

* * * * *